June 23, 1953 G. GUIST 2,642,771
DEVICE FOR DETECTING AND DETERMINING REFRACTION
ANOMALIES OF THE HUMAN EYES
Filed June 13, 1949 3 Sheets-Sheet 1

Inventor.
Gustav Guist.

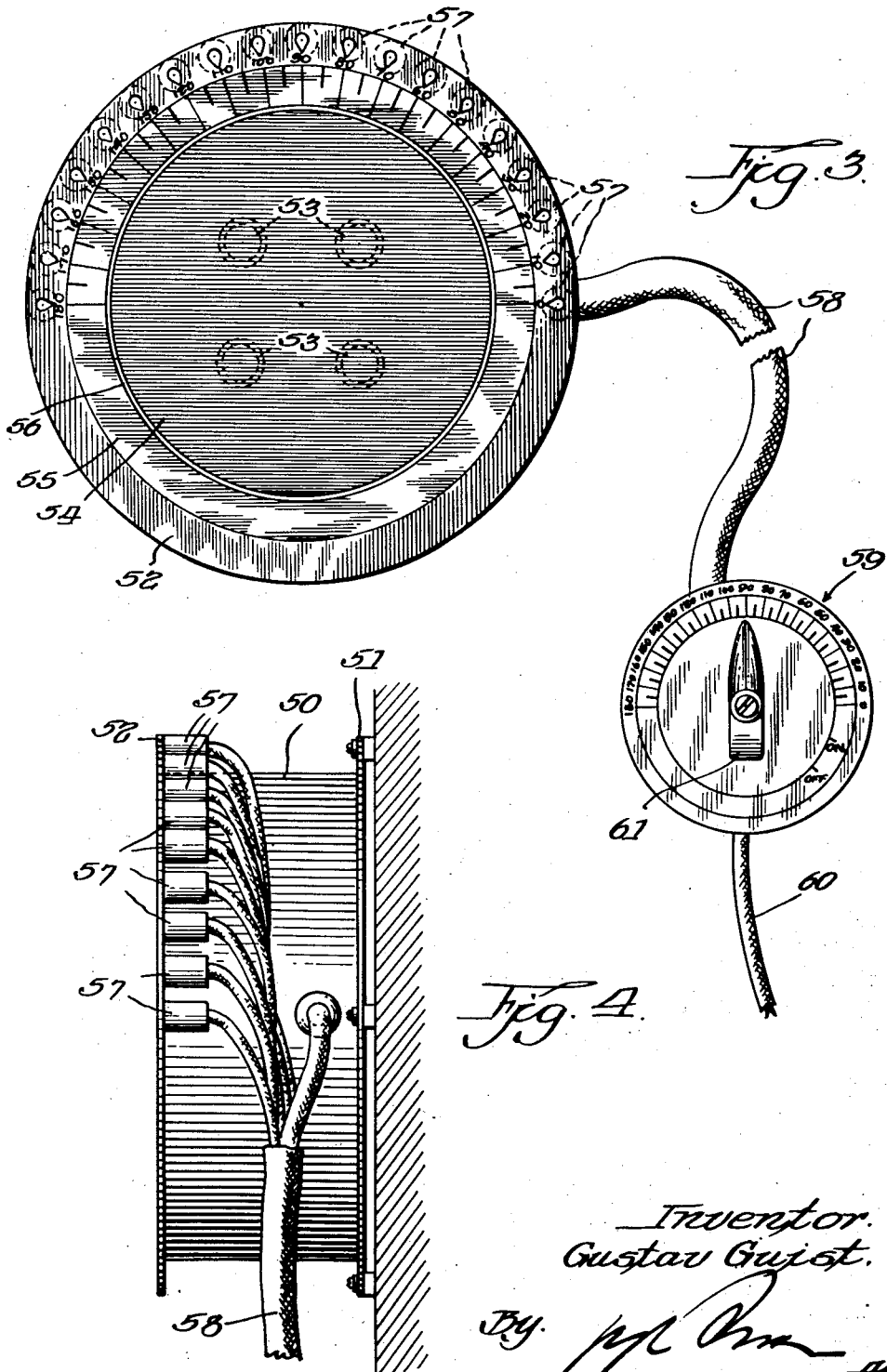

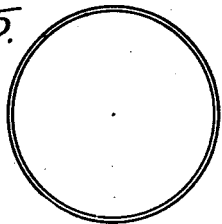

LUMINOUS LINE SHARPLY
OUTLINED = NORMAL EYE

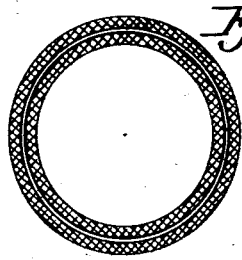

LUMINOUS LINE APPEARING CIRCULAR
WITH INSIDE AND OUTSIDE HALO =
SPHERICAL REFRACTION ANOMALY =
HYPEROPIA OR MYOPIA

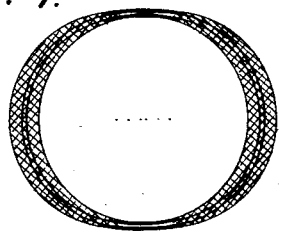

LUMINOUS LINE APPEARING OVAL
AND 90° TO DISTORTION PLANE IN
SHARP OUTLINE =
SIMPLE ASTIGMATISM

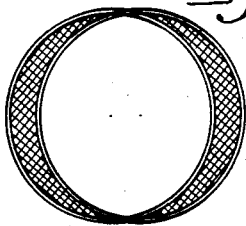

LUMINOUS LINE SEEN DOUBLE
[OR MORE] ON OPPOSITE SIDES AND
90° TO DISTORTION PLANE IN SHARP
OUTLINE = SIMPLE ASTIGMATISM

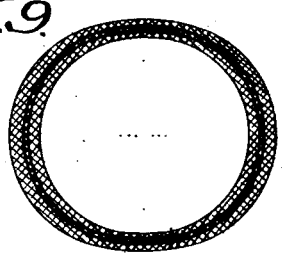

LUMINOUS LINE APPEARING AS DIM
OVAL BUT SHARPER AT TWO OPPOSITE
POINTS = MIXED ASTIGMATISM

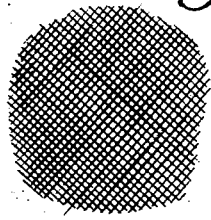

LUMINOUS LINE APPEARING AS DIM
LIGHT WITH NO CLEAR OUTLINE OF
ANY GEOMETRIC STRUCTURE = HIGH
MYOPIA - HIGH HYPEROPIA
[COMBINED WITH ASTIGMATISM]

Patented June 23, 1953

2,642,771

UNITED STATES PATENT OFFICE 2,642,771

DEVICE FOR DETECTING AND DETERMINING REFRACTION ANOMALIES OF THE HUMAN EYES

Gustav Guist, Vienna, Austria

Application June 13, 1949, Serial No. 98,726

2 Claims. (Cl. 88—20)

1

This invention is concerned with a device for detecting and determining refraction anomalies of the human eye and for checking eyeglasses for the refraction accuracy which is required to correct predetermined defects of vision.

The principal object of the invention is to provide a simple device which may be used in detecting and determining refraction anomalies of the eyes preparatory to prescribing the necessary eyeglasses and which may also be used for checking the refraction accuracy of the prescribed glasses in actual use by the patient.

A specific object of the invention is to provide a device of the type noted above which is adapted to produce a luminous substantially perfectly circular test line of substantially uniform brightness and predetermined width and diameter for inspection by a patient at a predetermined distance.

Another object is to provide a device for use as an aid in subjective examination of the eyes, for visual inspection by the patient, and means associated with said device including standard notations of cylinders for determining the axes of astigmatism.

Still another object is to provide a device of the type as outlined in the foregoing paragraph, together with indicator means controlled by the examining physician or by the patient, for determining the axes of astigmatism.

These and other objects and features of the invention will be brought out in the course of the detailed description which is rendered below with reference to the accompanying drawings. In these drawings, Fig. 1 shows an embodiment of the invention in diagrammatic frontal elevational view;

Fig. 3 is a diagrammatic frontal elevational view of another embodiment of the invention;

Fig. 4 shows the embodiment of Fig. 3 from the side thereof; and

Figs. 5–10, inclusive, are examples of diagnostic diagrams to aid in explaining the invention and the use thereof in the examination of eyes.

Like parts are numbered alike throughout the drawings. Known elements and details will be referred to only to the extent required for explaining the invention.

Figure 2:
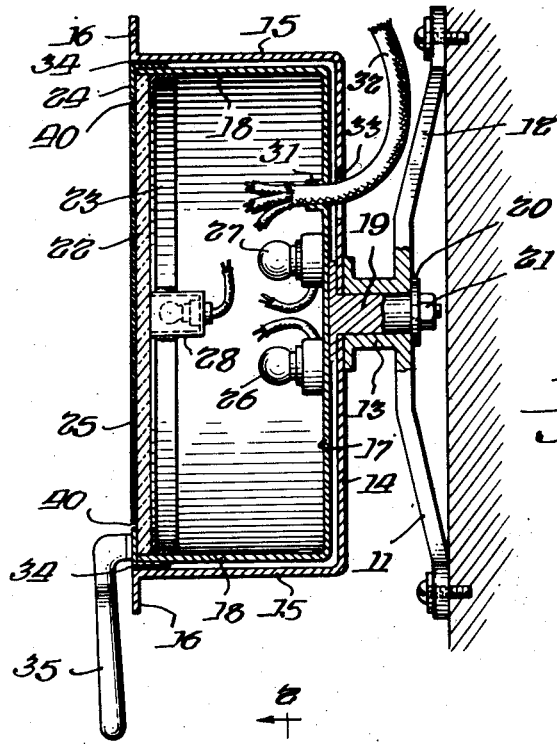
Fig. 2 illustrates the device in section, taken approximately along lines 2—2 of Fig. 1.
Figure 1:
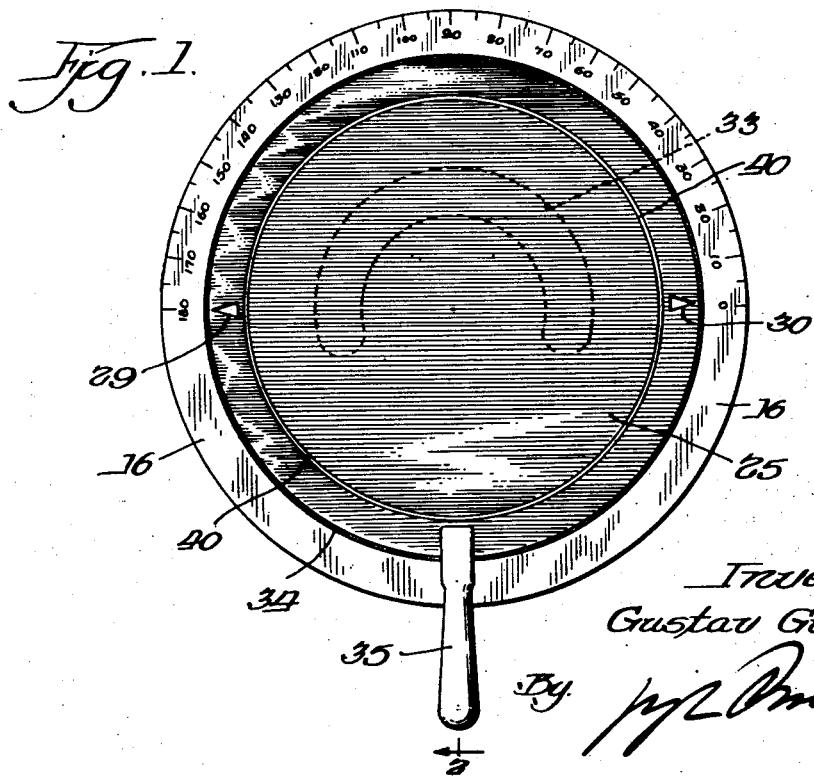

The device shown in Figs. 1 and 2 is provided with a mounting for attachment to a support, e. g., a wall. It comprises suitable mounting means which may be in the form of a standard having legs such as 11 and 12 which radiate spiderlike from a journal bushing 13. Secured to this bushing 13 is a pot-like outer receptacle or casing having the bottom wall 14 and the side

2 wall 15 which terminates in the radially outwardly directed flange or rim 16. This outer casing is thus disposed in relatively stationary position. The face of the flange or rim 16 is provided in its upper sector with index marks from 0° to 180°, corresponding to standard notations of cylinders, as is particularly shown in Fig. 1. These marks are employed for determining the axes of astigmatism in a manner which will be presently described in detail.

An inner housing is provided, comprising a bottom wall 17 and a side wall 18. The bottom wall carries a journal pin 19 which is rotatably disposed within the journal bushing 13 and is axially secured in position by suitable means, e. g., the washer 20 and nut 21. This inner housing with all parts associated therewith is thus rotatable within and with respect to the stationary casing.

The forward end of the inner housing is closed by a translucent panel or disk 22 which is held in position by an angular inner retainer ring 23 and by an angular outer retainer ring 24.

An opaque circular area substantially 200 mm. in diameter is formed on the outer surface of the translucent panel 22, as indicated at 25. This may be done in any suitable and approved manner, e. g., by suitably securing an opaque disk to the outer surface of the translucent panel 22 or suitably applying, e. g., spraying, opaque paint thereon so as to form the circular opaque area 25. The peripheral edge of this opaque area 25 forms with the inner edge of the radially inwardly extending flange of the angular retainer ring 24 a substantially perfectly circular slot 40 of a width of substantially 2 mm. The translucent panel 22 is exposed along this circular slot and diffused light rays produced on the inside of the inner housing can thus project through the translucent panel 22, forming a luminous, substantially perfectly circular line 40 of substantially uniform brightness, 200 mm. in diameter and 2 mm. wide. The surfaces of the radially inwardly directed flange of the angular retainer 24 and also the outer surface of the rim 16 are preferably finished in accordance with the finish of the opaque area 25 to present a uniform appearance therewith. A dark shade, e. g., black, is preferably chosen for the finish of these surfaces, including that of the opaque area 25.

Inside of the inner housing are provided suitable light sources such as indicated at 26—27. These light sources are arranged in the central portion of the inner housing radially and axially spaced from the exposed circular area of the translucent panel 22, and the inner walls of the inner housing are preferably finished, e. g., painted, a light color to produce strong but diffused light which radiates to the outside through the exposed circular area of the translucent panel to form the luminous substantially perfectly circular line 40 of substantially uniform brightness, 200 mm. in diameter and 2 mm. in width. The dimensions given for this line are considered optimal and may be critical, as will be presently explained more in detail.

Secured to the radially disposed flange of the retainer ring 24 and projecting inwardly therefrom are two relatively small, potlike receptacles, as indicated in Fig. 2 at 28, each containing a small light bulb. The corresponding peripheral portions of the translucent panel 22 may be cut away to accommodate these receptacles. The flange of the retainer 24 is provided with index openings, as indicated in Fig. 1 at 29—30, which are aligned with the respective receptacles such as 28 so as to project light through the outside. These openings or cutouts 29—30 are in the form of arrows pointing radially outwardly, and each may be closed by a suitable sight window. Light rays from the inside of the receptacles 28 will thus appear at the front in the form of two luminous arrows 29—30. It should be observed that the light sources for these arrows are separate from those for the luminous line 40 and isolated therefrom.

A portion of the bottom wall 17 of the inner rotatable housing is turned inwardly, as indicated at 31 in Fig. 2, to form a bushinglike restricted outlet aperture for accommodating the cable 32 which carries the conductors for supplying current to the light bulbs 26—27 and also to the light bulbs 28. The outlet aperture formed by the bushinglike portion 31 should be just large enough to accommodate the cable 32 without emitting light rearwardly. A special bushing may take the place of the portion 31 to serve as an outlet for the cable. A low operating voltage is employed to avoid undesired production of heat inside the inner housing. The bottom wall 14 of the stationary outer casing is provided with an arcuate slot 33 to accommodate the cable 32 incident to rotation of the rotatable inner housing relative to the stationary casing.

In order to cushion and to guide the free frontal end of the inner housing within the stationary outer casing, a suitable gasket, for example, a felt gasket 34, may be provided in the space between the outer casing in contact with the axially inwardly directed portion of the angular retainer ring 24. This gasket will also serve as an additional safeguard against inadvertent seepage of light to the front of the device. If desired, the arcuate slot 33 may be suitably shielded against inadvertent and undesired seepage of light from the inner housing rearwardly to the outside. Such seepage is prevented by the bushingike member 31, but additional shielding means such as indicated, or any other desired and suitable shielding means, may of course be provided.

The radially inwardly directed annular portion of the retainer ring 24 carries a handle 35 which permits rotation of the inner housing with respect to the outer housing. During examination of a patient, the physician positions himself in proximity to the device while the patient is seated at a distance of substantially 6 m. or 20 feet away, inspecting the luminous circular line 40. At a certain point of the examination the physician actuates a switch (not shown) in order to illuminate the arrowlike openings 29—30 and then rotates the inner housing with respect to the outer housing, in accordance with information supplied by the patient in case of astigmatism, so as to align the luminous arrows 29—30 with certain of the index marks carried on the rim 16 of the stationary outer casing to establish the axis of the cylindrical correction which he has to make in order to provide the proper eyeglasses required to correct the patient's astigmatic defect of vision. This phase of the procedure will appear from the description of the examination of the eyes to be carried out with the aid of the invention as outlined below with reference to the diagrams shown in Figs. 5–10.

Referring now to these diagrams: The examination is made in a room with the patient seated at a distance of 6 m. (20 feet) from the instrument. The examining physician is positioned in proximity to the instrument. The cable 32 (Fig. 2) terminates in a suitable switch which is controlled by the physician. The room is darkened at a certain juncture of the examination in order to allow relaxation of the mechanism of accommodation of the patient's eyes. The physician, after a certain interval after darkening the room, operates the switch to illuminate the interior of the inner housing so as to produce the substantially perfectly circular luminous test line 40. It may be remarked at this point that it is believed new to employ for eye examination an illuminated geometric figure, and particularly a luminous line, in the manner disclosed herein.

With normal eyes the patient will see the luminous line in perfectly circular and sharp outline, as indicated in Fig. 5.

If the patient sees the luminous line in circular outline but with a halo radiating to the inside and also to the outside substantially equally, as indicated in Fig. 6, then we have a spherical refraction anomaly which may be an indication either of hyperopia or of myopia. In this case, the physician puts a test frame in front of the patient's eyes and successively uses plus or minus spherical lenses in front of either or both eyes, until the patient sees the luminous circular line in perfectly circular and sharp outline, as indicated in Fig. 5. The lenses accomplishing this result indicate to the examining physician the refraction which he has to prescribe to obtain the glasses which are to correct the visual defect of the patient as established by the examination.

If the luminous circular line is seen by the patient as an oval, with a halo radiating to the inside and outside along the test line on opposite ends of the oval, or on opposite sides double or more, with dimness appearing within the overlapping areas of the test line, and 90° to this area in more or less sharp outline, as indicated in Figs. 7 and 8, respectively, then we have simple astigmatism. The points or areas 90° to the plane of distortion, which are seen relatively sharp by the patient, may be observed at any two opposite portions of the test line, depending on the axis of the astigmatism. In the examples shown in Figs. 7 and 8, it is assumed that the axis is at 12 o'clock or 90° to the horizontal plane of distortion. The physician, after being informed by the patient that the test line appears in sharp outline, e. g., at two opposite points or areas at about six and twelve o'clock, respectively, operates a switch to turn on the light bulbs within the two small casings 28 so as to illuminate the index arrows 29—30. He then rotates the inner housing relative to the outer housing until one or the other arrow 29—30 (depending on the direction of rotation) is angularly aligned with that portion or point of the upper sector of the luminous line which appears to the patient in sharp outline. The corresponding index mark furnishes the axis of the astigmatism, which in the assumed case is 90°.

The physician then uses plus or minus cylindrical lenses in his test frame in front of either or both eyes of the patient, until the patient sees the circular luminous line completely circular and in sharp outline, as indicated in Fig. 5. The lenses used in the test frame by the physician at this point indicate the data which he has to prescribe for the glasses to correct the astigmatic defect of the patient.

The sharply outline portions of the test line, as indicated in Figs. 7 and 8 (also in Fig. 9) are approximations for explanatory purposes. The extent of these portions may vary.

The index marks are shown in increments of ten degrees for explanation only. Closer subdivision may be adopted. The lower sector may be provided with index marks in addition to those in the upper sector or in lieu thereof, if desired.

If the patient informs the physician that the luminous line 40 appears to him as a dim oval, but relatively sharper at two opposite points, as indicated in Fig. 9, for example, then the physician, after establishing the axis of the astigmatism as before, uses in the test frame, in addition to the spherical lenses, cylindrical lenses until the luminous line 40 is brought into sharp focus and seen by the patient as a perfectly circular line and sharply outlined, as shown in Fig. 5. This is a case of a so-called "mixed astigmatism" and the physician will then prescribe a combination of spherical and cylindrical lenses.

If the patient sees the luminous line only as a dim light, with no clear perception of any geometric structure, as indicated in Fig. 10, this indicates the likelihood of very high hyperopia or high myopia, either of which may be combined with astigmatism. The bracketed notation in Fig. 10 points to the possibility of astigmatism coexisting with either myopia or hyperopia.

The physician, in the presence of such visual impression, uses in his test frame very high plus or minus spherical lenses until the patient perceives a sharply outlined circular luminous line. If this is accomplished, the examination is completed and the physician prescribes high plus or minus spherical lenses to correct the corresponding hyperopia or myopia defect.

If the desired correction is not accomplished by the use of spherical lenses, and if the patient informs the physician that he does not see the luminous circular line in sharp outline, but as an oval, with an impression of overlapping dimness, then the physician knows that, in addition to very high hyperopia or myopia, there is also astigmatism, and he changes the spherical lenses until the cutting points of the overlapping areas are perceived by the patient in absolutely sharp outline. The axis of astigmatism is then established as before, by rotating the inner housing to bring about alignment of the luminous arrows with the sharply outlined cutting edges perceived by the patient, whereupon cylindrical lenses are used in the test frame to correct the remaining dimness. The lenses which accomplish this result indicate again the data for the cylindrical lenses which are necessary in addition to the high plus or minus spherical lenses.

The advantages of the invention will be apparent from the examination procedures given in the foregoing discussion for the purpose of furnishing examples which point to actual use. Among the obvious advantages are: (a) examination can be carried out in most cases where the subjective method can be applied, that is, with most adult patients, without the use of cycloplegics such as atropine or homatropine to induce paralysis of the ciliary muscle, and consequently without the use of the ophthalmoscope, ophthalmometer or other instruments, thereby appreciably reducing the time of examination and avoiding considerable inconvenience to the patient, and in certain cases even danger to the patient's vision, which may result from the use of cycloplegics; (b) the invention furnishes information as to the axis of astigmatism simply by rotating the inner housing with respect to the stationary outer housing until one or the other of the illuminated arrows 29—30 (Fig. 1) is aligned with the corresponding point or area where the luminous line appears to the patient in sharp outline, as indicated, e. g., in Figs. 7, 8 and 9; (c) the device made in accordance with the invention may be used not only as an aid in diagnosing defects in vision, but may also be used either by the physician or by the optometrist in checking the refraction accuracy of the glasses prescribed, in actual use thereof by the patient. This latter phase of the practice of the invention will be presently described more in detail.

The use of a substantially perfectly circular luminous line in eye examination is believed to be entirely novel, and it may be mentioned at this point that, as established by experience, the dimensions given for such line, namely, substantially 200 mm. diameter and substantially uniformly 2 mm. in width, are believed to be optional and in a sense critical. If the width of the line is less than 2 mm. it is difficult to see; and, if the width is in excess of 2 mm., the overlapping areas, as they appear in the case of astigmatism and as indicated, for example, in Fig. 8, are difficult to recognize. If the diameter of the luminous line is less than 200 mm., the overlapping areas appear narrower and are difficult to recognize; and, if the diameter is more than 200 mm., the entire luminous line is difficult to watch because the eye is induced to rove to scan the field.

It is necessary, in the embodiment described with reference to Figs. 1 and 2, that the examining physician elicit from the patient information not only as to the appearance of the luminous line, so as to obtain clues to the defect of vision that may exist, but in the presence of astigmatism also information as to the angular alignment of the arrowlike light spots 29—30 with the corresponding degree graduations on the scale carried by the rim 16 of the stationary housing. This necessity introduces an additional subjective element which is disturbing and consumes time. The resulting subjective disadvantage is overcome by the embodiment shown in Figs. 3 and 4.

Referring now to these figures: The modified device comprises a stationary housing which may be circular in shape, having the axially extending wall 50, the flange 51 for suitable attachment to a surface, for example, a wall, by means of spacers and screws, as shown, and having at its frontal end the flange or rim 52. Inside of the stationary housing are again provided light sources such as indicated in Fig. 3 in dotted lines marked 53 corresponding to sources 26—27 shown in the previously described embodiment, and the housing is closed to the outside at its frontal end by means forming an opaque circular area 54 corresponding to the opaque area 25 of the previous embodiment and an annular opaque area 55 forming with the area 54 a substantially perfectly circular slot or aperture 56 corresponding to the similar slot or aperture 40 of the previous embodiment, through which diffused light rays produced by the light sources 53 inside of the housing will radiate, for example, through a suitable translucent panel such as 22 described in connection with Figs. 1 and 2, to form the substantially perfectly circular luminous line for observation by the patient. The annular area 55 is again provided with a scale having degree graduations from 0° to 180° which correspond to standard notation of cylinders, as in the previous case. Remarks as to certain structural details made with reference to Figs. 1 and 2 are also sensibly applicable to the structure of the modified embodiment.

The rim 52 of the housing carries in its upper sector a number of small potlike casings 57 rearwardly projecting therefrom, each containing a small light bulb for illuminating an arrowlike sight and index window in the front of the rim 52 which is in alignment with a corresponding graduation mark on the scale carried by the annular area 55.

The cable 58 extends to a switching device generally marked by numeral 59 which is under the control of the patient. For this purpose the switching device 59 may be suitably attached to the rest of the chair in which the patient sits. The cable 60 may extend to a suitable source of power, which may be a suitable battery or a step-down transformer connected to the commercial network. Whenever the pointer end of the handle 61 of the switch is in radial alignment with an index mark, which corresponds to a similar degree index mark indicating an angular position on the device forming the luminous line 56, the corresponding small light bulb in the respective casing 57 will be connected to current and will illuminate the associated arrowlike pointer on the flange or rim 52. Thus, assuming the device shown in Fig. 3 to be in operation, with the pointer end of the handle 61 at 90°, the corresponding bulb in the housing 57 associated with the 90° index mark on the flange 52 will be connected to current and the arrow associated with 90° will be illuminated.

The switch 59 is a well known structure having a desired number of stationary contacts connected to one pole of a current source and a wiper contact controlled by the handle 61 by which any one of the stationary contacts may be connected with the other pole of the current source. Normally the pointer end of the handle 61 will be in "off" position with all the bulbs in their small casings 57 inoperative, and the light bulbs 53 likewise inoperative. The entire frontal surface of the instrument is therefore at rest so far as illumination is concerned. When the pointer end of the handle 61 is rotated to the "on" position, the light bulbs 53 will be connected to current to produce the luminous circular line 56 which remains illuminated for the duration of the examination until the pointer end of the handle 61 is returned to "off" position.

The examination of a patient proceeds as follows:

The patient is first instructed by the physician to rotate the handle 61 of the switch 59 from "off" position to "on" position and subsequently from "on" position successively in counterclockwise direction, at such times when he is instructed to do so. The examination room is then darkened to relax the mechanism of accommodation of the eyes, which requires a brief period, the duration of which is known to the physician by experience. At the end of such period, the patient is instructed to rotate the handle 61 of the switch 59 to the "on" position, whereupon the bulbs 53 are connected to current, illuminating the interior of the housing 50. The diffused light rays radiate through the circular slot 56, producing a substantially perfectly circular luminous line as before. The patient observes this line and informs the physician of the impression which he receives. It is understood of course that the patient views the luminous line at this phase of the examination, as in the previous case, without any ocular aid whatsoever. What he sees will depend on the existence or non-existence of visual defects, as already pointed out with reference to Figs. 5–10 in connection with the previously described structure. The physician again proceeds in accordance with the information received from the patient, determining the necessary ocular aid or aids by the use of lenses in the test frame which the patient now wears.

If the patient informs the physician that the luminous line appears to him as generally indicated in Fig. 7 or 8, that is, either as the outline of an oval and 90° to the plane of distortion in sharp outline, or that he sees the luminous line double or more on opposite sides and 90° to the plane of distortion in sharp outline, then the physician knows that there is simple astigmatism and will proceed accordingly, as already described. In order to establish the axis of astigmatism, the physician instructs the patient to rotate the handle 61 of the switch 59 farther in counterclockwise direction, thus producing successive illumination of the arrowlike sight areas associated with the corresponding index marks carried on the annular portion 55 and to stop rotation when an illuminated arrow points directly to the portion where he sees the oval (Fig. 7) or the double circles (Fig. 8) in sharp outline. This point corresponds again to the axis of astigmatism in the patient's eye, as indicated by the corresponding degree index mark on the annular area 55.

It will be seen from the foregoing discussion that the device made in accordance with Figs. 3 and 4 eliminates the subjective element which is introduced by discussion between patient and physician, thereby benefitting examination.

An advantage of considerable psychological value is obtained by making the patient an integral operatively participating element of the examination, thereby gaining his confidence, his cooperation, and sharpening his perception. To make the patient a part of the procedure thus contributes to the accuracy of the findings.

As has been intimated before, the device in either embodiment, in addition to its use as an aid in eye examination by a physician, may be used as an aid in checking the refraction accuracy of eyeglasses prescribed in accordance with certain findings. This may be done either by the physician or by the optometrist. The procedure is roughly similar to that employed in eye examination, as already described; that is, the patient is placed in a darkened room to relax the mechanism of accommodation of the eyes, whereupon he is asked to view the luminous line on the device. With unaided vision, the line will appear to the patient with the characteristic distortions in accordance with his particular refraction anomaly, as already discussed. The patient is then given his eyeglasses and now, again viewing the luminous line through the glasses, if the refraction of the glasses is correct as prescribed, the luminous line will appear to him as a substantially perfectly circular luminous line of substantially uniform brightness. The step of letting the patient view the luminous line without ocular aid may be eliminated from this procedure.

The circular luminous line may be produced by different means than those specifically described in the foregoing specification and illustrated in the drawings. For example, to indicate some of the expedients that will suggest themselves as equivalents, a rotating light or lights may be employed, if desired, in back of a circular slot, or a fluorescent tube or tubes may be used, or the circular line may be suitably projected onto the observation surface. The luminous line may also be composed of increments of light spots; i. e., instead of being formed, for example, of an uninterrupted slot, as described, producing a continuous uninterrupted line, it may be composed of circularly arranged dots, radial or concentric lines, small circles, a spiral line, triangles or rectangles. In short, it may be composed of any desired geometric components which produce astigmatic displacement when viewed by a person afflicted with astigmatism. Different geometric figures may be used singly or in successive or alternating groups to produce the circular luminous line. The color of the luminous line may in either one case be chosen as desired. The switching means may be modified, e. g., by furnishing a switch for control by the examining physician for turning on the light source or sources such as 53, in Figs. 3 and 4. Selective dual control may be provided for, e. g., by furnishing in addition to the switch 59 (Fig. 3) a similar switch for use by the examining physician, with suitable switching means for disconnecting the functioning of the patient's switch 59 in whole or in part, so as to enable the physician to take care of some or all of the switching operations, or to leave the switching operations to the patient, as may be desired by the physician in accordance with the type of patient under his care. If desired, the scale may be calibrated by marks denoting hours and minutes, in the nature of a clock face, instead of in standard notations of cylinders.

These and other changes may be made within the scope and spirit of the appended claims which define what is believed to be new and desired to have protected by United States Letters Patent.

I claim:

1. As an aid in the subjective examination of the human eyes, a device comprising a closed circular housing having axially spaced front and rear walls and an annular side wall connecting such front and rear walls, means in said front wall forming a single substantially perfectly circular circularly continuous slot constituting a test line of predetermined width and diameter, an outer potlike casing having a bottom wall and an axially extending annular side wall, means for fixedly mounting said outer casing, means for rotatably mounting said closed circular housing within said outer potlike casing with the free outer end of the axially extending side wall of said potlike casing disposed in the plane of the front wall of said closed circular housing, a scale disposed on the free outer end of the side wall of said potlike casing, said scale being radially outwardly spaced from said test line, means for illuminating the interior of said housing to illuminate said test line, individual illuminating means for predetermined indicia marks on said scale, means for rotating said circular housing within said outer casing to displace said illuminated test line angularly relative to said scale, and a separate switching device for selectively illuminating said individual illuminating means to illuminate the indicia marks associated therewith for the purpose of selectively indicating the degree of angular displacement of said test line relative to said scale.

2. As an aid in the subjective examination of the human eyes, a device comprising a closed circular housing having axially spaced front and rear walls and an annular side wall connecting such front and rear walls, means in said front wall forming a single substantially perfectly circular circularly continuous slot constituting a test line of predetermined width and diameter, an outer potlike casing having a bottom wall and an axially extending annular side wall, means for fixedly mounting said outer casing, means for rotatably mounting said closed circular housing within said outer potlike casing with the free outer end of the axially extending side wall of said potlike casing disposed in the plane of the front wall of said closed circular housing, a scale disposed on the free outer end of the side wall of said potlike casing, said scale being radially outwardly spaced from said test line, means for illuminating the interior of said housing to illuminate said test line, a windowed aperture formed on the front wall of said housing radially outwardly spaced from said test line, said aperture forming an index mark, means for separately illuminating said index mark, and means for rotating said circular housing within said outer casing for angularly displacing said illuminated test line and said index mark relative to said scale, said illuminated index mark indicating the degree of angular displacement of said test line relative to said scale.

GUSTAV GUIST.

References Cited in the file of this patent

UNITED STATES PATENTS

| Number | Name | Date |
| --- | --- | --- |
| 1,558,348 | Ferree et al. | Oct. 20, 1925 |
| 1,564,495 | Sheard | Dec. 8, 1925 |
| 1,692,929 | Clement et al. | Nov. 27, 1928 |
| 1,761,238 | Scott | June 3, 1930 |
| 1,905,378 | Gechter | Apr. 25, 1933 |
| 1,986,002 | Leland | Jan. 1, 1935 |
| 2,065,430 | Cohen | Dec. 22, 1936 |

FOREIGN PATENTS

| Number | Country | Date |
| --- | --- | --- |
| 16,382 | Great Britain | Sept. 8, 1910 |
| 197,147 | Great Britain | May 10, 1923 |
| 170,870 | Switzerland | Oct. 16, 1934 |

OTHER REFERENCES

Thorington Text, Refraction and How To Refract, pages 135, 136, and 137. Published by P. Blakiston's Sons and Co., 1012 Walnut Street, Philadelphia, Pa., 1900.

Lawrence: "Visual Optics and Sight Testing" (Text). Published by the School of Optics Ltd., London, W. C. 1 (1926); pages 165, 166, and 167.

"Visual Optics" (Text), by H. H. Emsley (1939). Published by the Hatton Press, London; pages 141 and 142.

J. O. S. A., article by Wald et al., May 1947, vol. 37; pages 329 thru 331 and 333 thru 336.